United States Patent [19]

Shigyo et al.

[11] Patent Number: 4,960,993

[45] Date of Patent: Oct. 2, 1990

[54] RADIATING IMAGE READ-OUT AND DISPLAYING APPARATUS

[75] Inventors: Masao Shigyo; Eiichi Asai, both of Kanagawa, Japan

[73] Assignee: Fuji Photo Film Co., Ltd., Kanagawa, Japan

[21] Appl. No.: 320,426

[22] Filed: Mar. 8, 1989

[30] Foreign Application Priority Data

Mar. 14, 1988 [JP] Japan .................................. 63-59611

[51] Int. Cl.$^5$ ...................... G03B 42/00; G08C 19/00
[52] U.S. Cl. ............................... 250/327.2; 250/484.1
[58] Field of Search ................ 250/327.2 A, 327.2 B, 250/327.2 D, 484.1 B

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,320,296 | 3/1982 | Ishida et al. | 250/327.2 |
| 4,387,428 | 6/1983 | Ishida et al. | 364/413.13 |
| 4,507,797 | 3/1985 | Kato | 378/165 |
| 4,611,247 | 9/1986 | Ishida et al. | 358/458 |
| 4,739,480 | 4/1988 | Oono et al. | 364/413.13 |

Primary Examiner—Constantine Hannaher
Attorney, Agent, or Firm—Sughrue, Mion, Zinn, Macpeak & Seas

[57] ABSTRACT

A radiation image read-out and displaying apparatus comprises an image signal gathering section and an image processing and displaying section. The image signal gathering section comprises an image reader for obtaining an image signal which represents a radiation image, a code reader for obtaining a code signal which identifies the radiation image, and a device for entering an instruction signal representing how to treat the image signal. The image processing and displaying section comprises a device for receiving the image signal, the code signal and the instruction signal sent from the image signal gathering section, an image processor for processing the image signal, a storage device for storing the image signal, and a device for reproducing and dislaying a radiation image by using the processed image signal. When the code signal and image signal corresponding to an insruction signal are obtained, how the image signal is treated is based on the instruction signal.

3 Claims, 3 Drawing Sheets

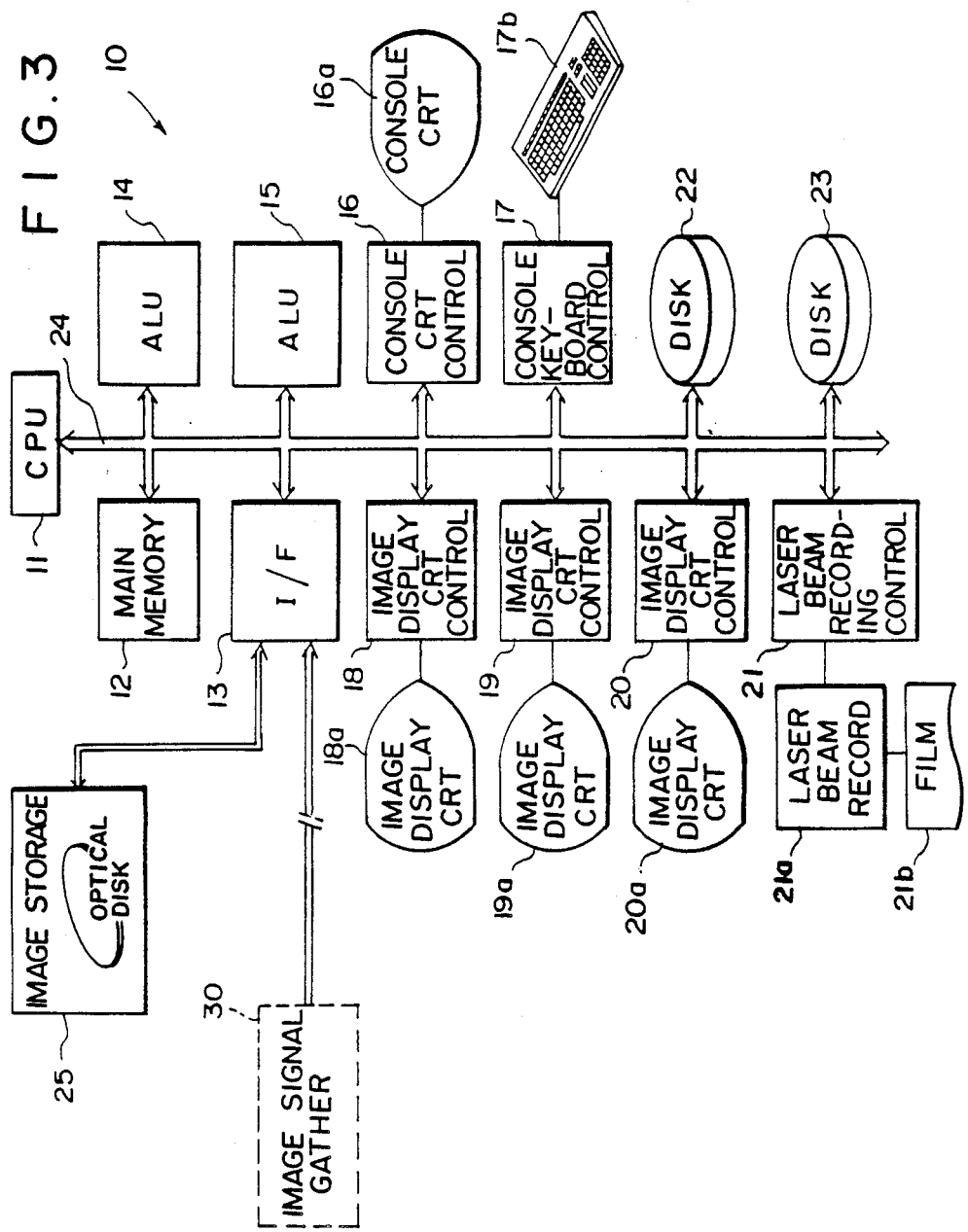

RADIATING IMAGE READ-OUT AND DISPLAYING APPARATUS

BACKGROUND OF THE INVENTION

1. Field of the Invention

This invention relates to a radiation image read-out and displaying apparatus for obtaining an image signal by reading out a radiation image, and reproducing and displaying a visible radiation image by use of the image signal.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, there has been proposed a system wherein an X-ray image is recorded on an X-ray film having a gamma value designed so as to match the type of image processing to be carried out, the X-ray image is read out from the X-ray film and converted into an electric signal, and the electric signal (image signal) is image-processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and by using the image signal the radiation image of the object is reproduced as a visible image on a recording material such as photographic film, a display device such as a cathode ray tube (CRT), or the like.

Radiation image recording and reproducing systems using stimulable phosphor sheets are advantageous over conventional radiography using silver halide photographic materials in that images can be recorded even when the energy intensity of the radiation to which the phosphor sheet is exposed varies over a wide range. More specifically, since the intensity of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed, by setting an appropriate read-out gain when reading out the emitted light and converting it into an electric signal to be used in reproducing a visible image on a recording medium or a display device.

Radiation image read-out and displaying apparatuses used in the aforesaid radiation image recording and reproducing systems are often required to process a large number of radiation images. By way of example, a radiation image read-out and displaying apparatus on such a large scale may be constituted of an image signal gathering section and an image processing and displaying section which are located remote from each other in separate rooms or the like. The image signal gathering section is constituted so as to obtain image signals by reading out radiation images, and enter ID information giving specifics about the image signals such as the name of the object recorded, the portion of an object, the image of which was recorded, or the date on which the image was recorded. The image processing and displaying section stores the image signals, carries out image processing of the image signals, and reproduces and displays visible radiation images by use of the processed image signals. The image signal gathering section and the image processing and displaying section are connected through cables or the like so that image signals and other signals sent from the image signal gathering section are received by the image processing and displaying section.

In the aforesaid radiation image read-out and displaying apparatuses, instructions about the type of image processing which is to be carried out on an image signal obtained in the image signal gathering section, the type of image display means on which a reproduced image is to be displayed when a plurality of image display means are provided, or the like are input at a console keyboard, which constitutes the image processing and displaying section, or the like.

In a large-scale radiation image read-out and displaying apparatus wherein a large number of radiation images should be processed, both the image signal gathering section and the image processing and displaying section are large, and necessary functions are shared therebetween. Therefore, the image signal gathering section and the image processing and displaying section are often provided at locations remote from each other, for example, in separate rooms as described above. In such cases, when the image signals obtained in the image signal gathering section must be processed immediately, for example, when it is urgent for the image signals to be processed and for visible images to be reproduced from the image signals after they are obtained, it is necessary for operators to be assigned to both the image signal gathering section and the image processing and displaying section. Alternatively, after the image signals are obtained in the image signal gathering section, an operator may move from the location of the image signal gathering section to the location of the image processing and displaying section in order to carry out the necessary operations. Therefore, the operating efficiency of the system as a whole becomes low.

SUMMARY OF THE INVENTION

The primary object of the present invention is to provide a radiation image read-out and displaying apparatus wherein an operator need not move from an image signal gathering section to an image processing and displaying section when these sections are provided at locations remote from each other.

Another object of the present invention is to provide a radiation image read-out and displaying apparatus wherein a high operating efficiency is achieved when an image signal gathering section and an image processing and displaying section are provided at locations remote from each other.

FIG. 1 is a schematic view showing the general configuration of a radiation image read-out and displaying apparatus in accordance with the present invention.

The present invention provides a radiation image read-out and displaying apparatus comprising:

(i) an image signal gathering section 1 which comprises:
 (a) an image read-out means 1a for reading out a recorded radiation image, thereby to obtain an image signal S1 which represents said radiation image,
 (b) a code reading means 1b for reading a code, which accompanies a radiation image and provides specifics about it, and generating a code signal S2 which represents said code,
 (c) an instruction signal entry means 1c for entering an instruction signal S3, which represents how to treat an image signal S1 identified by a specific code, before said image signal S1 and the code signal S2 are obtained, and
 (d) a signal sending means 1d for sending an image signal S1, a code signal S2 and an instruction signal S3, and (ii) an image processing and displaying section 2 which comprises:
 (a) a signal receiving means 2a for receiving an image signal S1, a code signal S2 and an instruction signal S3 sent from said signal sending means 1d,
 (b) an image processing means 2b for carrying out image processing on an image signal S1 received by said signal receiving means 2a,
 (c) at least one storage means 2c for storing image signals S1, and
 (d) an image display means 2d for reproducing and displaying a radiation image by use of a processed image signal, wherein, when a code signal S2 and an image signal S1 which correspond to an instruction signal S3 entered in advance at said instruction signal entry means 1c are obtained, how said image signal S1 is to be treated is based on said instruction signal S3.

The instruction signal S3 carries commands, for example, about the destination of the image signal S1, or the type of image processing which is to be carried out on the image signal S1. After the image signal S1, the code signal S2 and the instruction signal S3 are received by the signal receiving means 2a, the image signal S1 is processed in accordance with the instruction signal S3 and is then stored.

With the radiation image read-out and displaying apparatus in accordance with the present invention, the instruction signal S3 representing how an image signal S1 obtained by the image read-out means 1a is to be treated, for example, in which storage means the image signal S1 should be stored when a plurality of storage means are provided or the type of image processing which should be carried out on the image signal S1 when there are several types of image processing available, is entered from the instruction signal entry means 1c at the image signal gathering section 1. The image signal S1 and the instruction signal S2 are sent from the signal sending means 1d to the image processing and displaying section 2. At the image processing and displaying section 2, how to treat the image signal S1 received by the signal receiving means 2a is determined on the basis of the instruction signal S3 received by the signal receiving means 2a. Therefore, when the image signal gathering section 1 and the image processing and displaying section 2 are provided at separate locations remote from each other, an operator need not move from the image signal gathering section 1 to the image processing and displaying section 2. Accordingly, operating efficiency can be improved.

Applicant's invention is directed to a radiation image read-out and displaying apparatus wherein a high operating efficiency is achieved when an image signal gathering section and an image processing and displaying section are provided at locations remote from each other. In that invention, an image signal, identification code signal and processing instruction signal are associated and transmitted together to a remote processing section such that an operator need not move from an image signal gathering section to an image processing and displaying section.

More particularly, Applicant's invention is directed to a radiation image read-out and displaying apparatus for allowing image data gathering and processing instruction entry to be conducted at a first location, and image data processing to be conducted at a second location which is remote from said first location.

Applicant's apparatus comprises: (i) an image signal gathering section at the first location, which comprises: a) an image readout means for reading out a recorded radiation image, thereby to obtain an image signal which represents the radiation image; (b) a code reading means for reading an identification code, which accompanies a radiation image and provides specifics about it, and generating an identification code signal which represents the identification code; (c) an instruction signal entry means for entering a processing instruction signal, which represents how to process an image signal identified by the identification code signal; and (d) a signal transmitting means for electronically transmitting the image signal, identification code signal and processing instruction signal sent from the signal sending means and associating the image signal and processing instruction signal with the identification code signal, and (ii) an image processing and displaying section at the second location and which comprises: (a) a signal receiving means for receiving the image signal, identification code signal and processing instruction signal sent from the signal sending means and associating the image signal and processing instruction signal with the identification code signal; b) an image processing means for carrying out image processing on the image signal received by the signal receiving means, according to the processing instruction signal associated with the image signal by the identification code signal, and for producing a processed image signal; (c) at least one storage means for storing image data groups which each comprise one of the received image signal, identification code signal and processing instruction signal; and (d) an image display means for reproducing and displaying a radiation image by use of a processed image signal from the image processing means; wherein, when an identification code signal and image signal which correspond to a processing instruction signal entered in advance at said instruction signal entry means are obtained, how said image signal is to be processed at the image processing and displaying section is based on the processing instruction signal.

BRIEF DESCRIPTION OF THE DRAWINGS

FIG. 3 is a schematic view showing an embodiment of an image processing and displaying section of the radiation image read-out and displaying apparatus in accordance with the present invention.

DESCRIPTION OF THE PREFERRED EMBODIMENTS

The present invention will hereinbelow be described in further detail with reference to the accompanying drawings.

Figure 2:
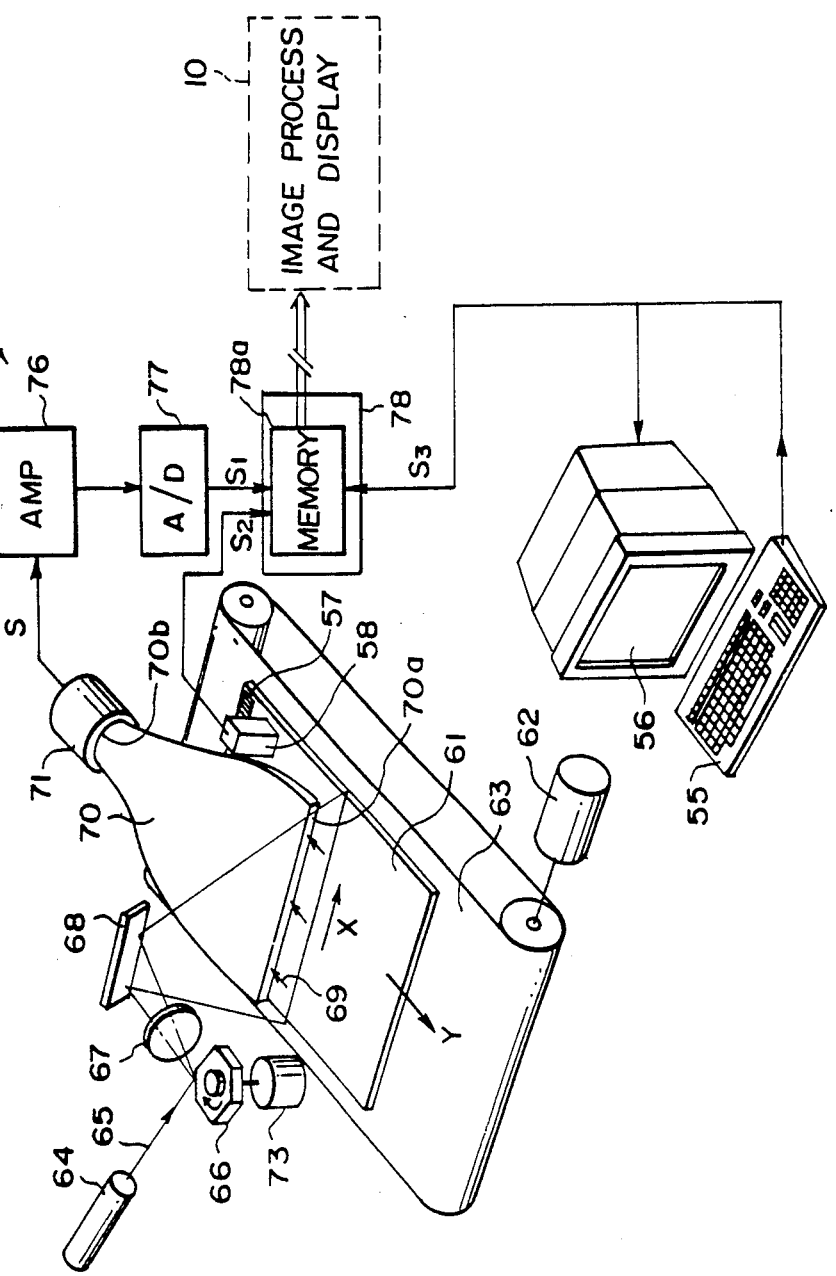
FIG. 2 is a perspective view showing an embodiment of an image signal gathering section of the radiation image read-out and displaying apparatus in accordance with the present invention.

With reference to FIG. 2, an embodiment of an image signal gathering section of the radiation image read-out and displaying apparatus in accordance with the present invention utilizes a stimulable phosphor sheet. As described above, when the stimulable phosphor, which constitutes a layer of the stimulable phosphor sheet, is exposed to radiation, it stores part of the energy of the radiation. Then, when the stimulable phosphor which has been exposed to the radiation is exposed to stimulating rays such as visible light, light is emitted by the stimulable phosphor in proportion to the amount of energy stored during exposure to the radiation.

The stimulable phosphor sheet was exposed to radiation which passed through an object such as the human body in an image recording apparatus (not shown), and a radiation image of the object is stored on the stimulable phosphor sheet.

A stimulable phosphor sheet 61 on which a radiation image has been stored in the manner described above is placed at a predetermined position in an image signal gathering section 30 shown in FIG. 2.

From the stimulable phosphor sheet 61, an image signal representing the radiation image stored thereon is detected as will be described later. Before the image signal is obtained, an instruction signal S3 is entered at a keyboard 55 which constitutes an instruction signal entry means. A CRT display device 56 is provided to confirm that the entered instruction signal S3 or the like is correct. The instruction signal S3 specifies, for example, a code identifying a radiation image, the type of image processing which should be carried out on the image signal representing the specified radiation image, the type and location of a storage means in which the image signal should be stored, whether a visible image reproduced from the image signal should be or should not be displayed, and the mode of display when the reproduced visible image should be displayed. Information about the specified radiation image such as the name of the object, the image of which was recorded, the portion of the object the image of which was recorded, and the date of image recording is also entered at the keyboard 55. The information about the radiation image is also included in the instruction signal S3. A plurality of instruction signals S3 may be entered sequentially so that they correspond to a plurality of stimulable phosphor sheets from which radiation images will be read out. An entered instruction signal S3 is stored in a memory 78a in a signal sending means 78, which sends the instruction signal S3 and the like to an image processing and displaying section 10.

After the instruction signal S3 is entered, an image signal Sl and a code signal S2 are read in the manner described below.

The stimulable phosphor sheet 61 placed in the image signal gathering section is conveyed in a subscanning direction indicated by the arrow Y by a sheet conveyance means 63 constituted of an endless belt or the like operated by a motor 62. On the other hand, stimulating rays 65 produced by a laser beam source 64 are reflected and deflected by a rotating polygon mirror 66, which is quickly rotated by a motor 73 in the direction indicated by the arrow, and the stimulating rays 65 pass through a converging lens 67 constituted of an f$\theta$ lens or the like. The direction of the optical path of the stimulating rays 65 is then changed by a mirror 68, and the stimulating rays 65 impinge upon the stimulable phosphor sheet 61 and scan across it in a main scanning direction indicated by the arrow X, which main scanning direction is approximately normal to the subscanning direction indicated by the arrow Y. When the stimulable phosphor sheet 61 is exposed to the stimulating rays 65, the exposed portion of the stimulable phosphor sheet 61 emits light 69 with an intensity proportional to the amount of energy stored during exposure to radiation. The emitted light 69 is guided by a light guide member 70, and photoelectrically detected by a photomultiplier 71 which acts as a photodetector. The light guide member 70 is made from a light guiding material such as an acrylic plate, and has a linear light input face 70a positioned so that it extends along the main scanning line on the stimulable phosphor sheet 61, and a ring-shaped light output face 70b is positioned in close contact with a light receiving face of the photomultiplier 71. The emitted light 69 entering the light guide member 70 through its light input face 70a is guided through repeated total reflection inside of the light guide member 70, emanates from the light output face 70b, and is received by the photomultiplier 71. In this manner, the intensity of the emitted light 69, which carries the information about the radiation image, is detected by the photomultiplier 71. An analog signal S generated by the photomultiplier 71 is amplified by an amplifier 76. The analog signal S, after being amplified, is sampled by an A/D converter 77 at predetermined intervals, and the sampled analog signal S is digitized. The digital image signal Sl thus obtained is stored in the memory 78a.

A bar code 57 for identifying the radiation image stored on the stimulable phosphor sheet 61 is recorded on the stimulable phosphor sheet 61. The stimulable phosphor sheet 61 is conveyed in the direction indicated by the arrow Y until the bar code 57 is brought to a code reading means 58. Then the bar code 57 is read by the code reading means 58, and the code signal S2 is obtained. The code signal S2 is stored in the memory 78a in the signal sending means 78.

The radiation image is identified by the code signal S2, and therefore the image signal Sl representing the radiation image is also identified. Also, correspondence between the image signal Sl and the instruction signal S3, which represents how the image signal Sl is to be treated, is established.

After the image signal Sl, the code signal S2 and the instruction signal S3 corresponding to a single radiation image have been gathered, they are sent from the signal sending means 78 to the image processing and displaying section 10 as will be described later. An image is read out from the next stimulable phosphor sheet only after the signals Sl, S2 and S3 have been sent and the memory 78a is readied for storing the next image signal.

The aforesaid bar code need not necessarily be recorded on the stimulable phosphor sheet 61, but may be recorded on a housing in which the stimulable phosphor sheet 61 is accommodated, or on a card or the like which is transported and processed together with the stimulable phosphor sheet 61. Also, instead of the bar code, any other known code may be employed.

Also, the image signal gathering section may be constituted so that it obtains image signals by reading out, for example, an X-ray images recorded on conventional X-ray film, instead of reading out images from stimulable phosphor sheets.

With reference to FIG. 3, the image processing and displaying section 10 comprises a central processing unit (hereinafter abbreviated to CPU) 11, and a main memory 12 which may be constituted of an IC memory or the like for storing the programs and various flags required to operate the section. An interface 13 connects the image signal gathering section 30 shown in FIG. 2 with an image signal storage device 25 which may be constituted of an optical disk device or the like. Image processing units (hereinafter abbreviated to ALU's) 14 and 15 carry out appropriate processing on the image signals entered via the interface 13. A control device 16 controls a console CRT display device 16a, and a control device 17 controls a console keyboard 17b. Control devices 18, 19 and 20 are connected respectively to CRT display devices 18a, 19a and 20a for displaying images. Control device 21 controls a laser beam recording device 21a which reproduces radiation images on photographic film 21b. The image processing and displaying section 10 also comprises magnetic disk devices (hereinafter abbreviated to DISK's) 22 and 23. The units (and devices) 11 through 23 are connected with one another via a bus line 24.

Figure 1:
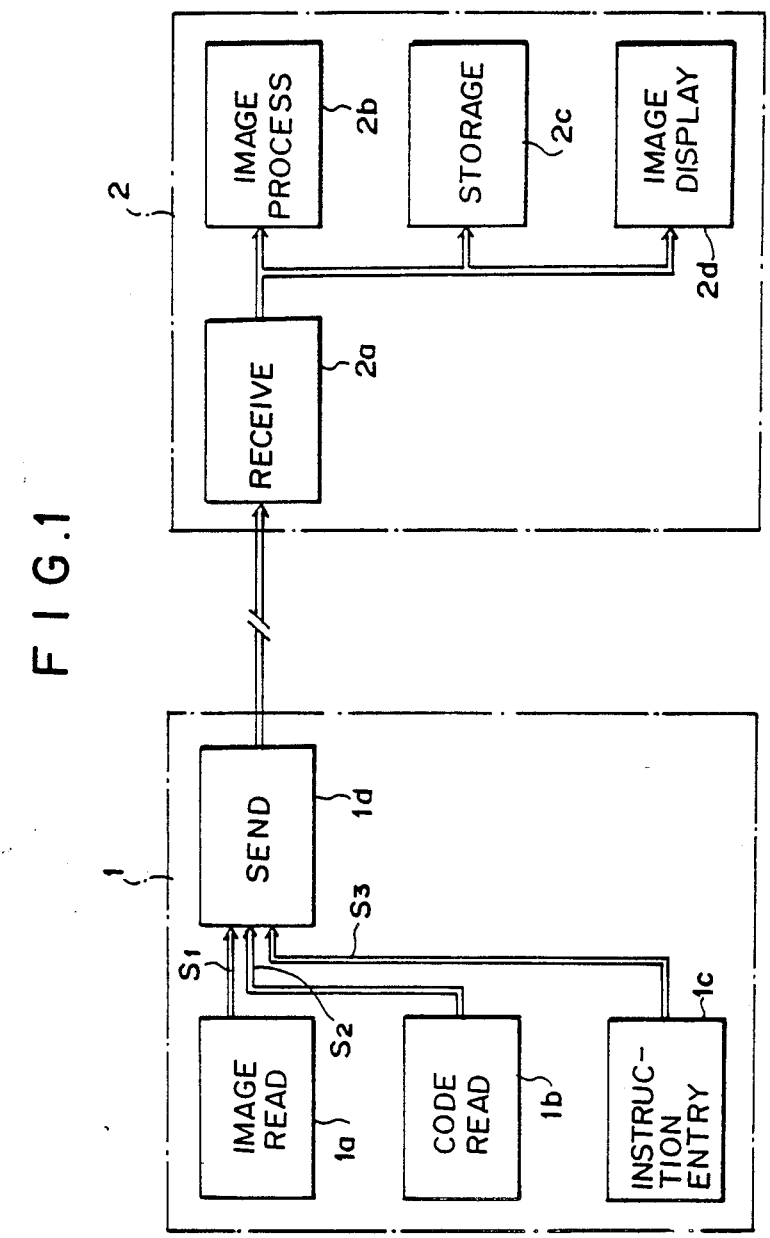
FIG. 1 is a schematic view showing the general configuration of a radiation image read-out and displaying apparatus in accordance with the present invention.

A portion of the interface 13 which receives the signals sent from the image signal gathering section 30 corresponds approximately to the signal receiving means 2a shown in FIG. 1. The ALU's 14 and 15 correspond approximately to the image processing means 2b shown in FIG. 1. The DISK 22, the image signal storage device 25, and a portion of the interface 13, which connects the image signal storage device 25 with the bus line 24, correspond approximately to the storage means 2c shown in FIG. 1. The control devices 18, 19, 20 and 21, the CRT display devices 18a, 19a and 20a, the laser beam recording device 21a, and the photographic film 21b correspond to the image display means 2d shown in FIG. 1.

The CPU 11 controls the units (and devices) 13 through 23 in accordance with the programs stored in the main memory 12. The control devices 16 and 17, the console CRT display device 16a, and the console keyboard 17b are used for confirming that the conditions under which the image processing and displaying section 10 is operating are correct. Also, the DISK 23 stores the programs which are transferred to the main memory 12 and executed. Therefore, the CPU 11, the main memory 12, the control device 16 and the console CRT display device 16a, the control device 17 and the console keyboard 17b, and the DISK 23 correspond to the means 2a, 2b, 2c and 2d shown in FIG. 1 in accordance with the types of the programs to be run, the instructions entered, and the like.

An image signal Sl, a code signal S2 and an instruction signal S3 are delivered by the image signal gathering section 30 to the interface 13, and then stored in the DISK 22. After the signals Sl, S2 and S3 corresponding to a single radiation image have been received, the instruction signal S3 is read from the DISK 22 into the main memory 12, and how an image signal Sl should be treated, as specified by the instruction signal S3, is investigated. The ways in which an image signal may be treated might include, for example, transferring the image signal Sl into the ALU 14 in order to carry out a predetermined type of image processing on it, transferring the image signal after it has been image-processed into the control device 21 so that a visible image therefrom can be reproduced on photographic film 21b, or transferring the image signal into the image signal storage device 25 for storing them it on an optical disk.

Selecting the destination of the image signal, the type of image processing which is to be carried out on the image signal, or the like is also carried out by entering instructions at the console keyboard 17b after the image signal and other signals are delivered to the image processing and displaying section 10. Based on the instructions entered at the console keyboard 17b, an image signal, which has been transferred into and stored in the image signal storage device 25 according to the commands indicated by the instruction signal S3, may be transferred into, for example, the DISK 22. The image signal may then be transferred from the DISK 22 into the ALU 15 and undergo appropriate image processing. After the image signal is processed, it is transferred into the control device 18, and a visible radiation image is reproduced and displayed on the CRT display device 18a by use of the transferred image signal.

Of course, the image processing and displaying section may be embodied in various other manners.

We claim:

1. A radiation image read-out and displaying apparatus for allowing image data gathering and processing instruction entry to be conducted at a first location, and image data processing to be conducted at a second location which is remote from said first location, said apparatus comprising:

(i) an image signal gathering section at said first location, which comprises:

(a) an image read-out means for reading out a recorded radiation image, thereby to obtain an image signal which represents said radiation image, (b) a code reading means for reading an identification code, which accompanies a radiation image and provides specifics about it, and generating an identification code signal which represents said identification code, (c) an instruction signal entry means for entering a processing instruction signal, which represents how to process an image signal identified by said identification code signal, and (d) a signal transmitting means for electronically transmitting said image signal, identification code signal and processing instruction signal sent from said signal sending means and associating said image signal and processing instruction signal with said identification code signal, and (ii) an image processing and displaying section at said second location and which comprises:
  (a) a signal receiving means for receiving said image signal, identification code signal and processing instruction signal sent from said signal sending means and associating said image signal and processing instruction signal with said identification code signal,
  (b) an image processing means for carrying out image processing on said image signal received by said signal receiving means, according to said processing instruction signal associated with said image signal by said identification code signal, and for producing a processed image signal,
  (c) at least one storage means for storing image data groups which each comprise one of received said image signal, identification code signal and processing instruction signal, and
  (d) an image display means for reproducing and displaying a radiation image by use of a processed image signal from said image processing means, wherein, when an identification code signal and an image signal which correspond to a processing instruction signal entered in advance at said instruction signal entry means are obtained, how said image signal is to be processed at said image processing and displaying section is based on said processing instruction signal.

2. An apparatus as defined in claim 1 wherein said processing instruction signal indicates a transfer destination of the image signal which corresponds to said processing instruction signal, and the type of image processing which should be carried out on said image signal.

3. An apparatus as defined in claim 1 wherein said image read-out means reads out a radiation image stored on a stimulable phosphor sheet by two-dimensionally scanning said stimulable phosphor sheet with stimulating rays which cause said stimulable phosphor sheet to emit light in proportion to the amount of energy stored when the stimulable phosphor sheet was exposed to radiation and photoelectrically detecting the emitted light.

* * * * *